United States Patent
Yoo et al.

(10) Patent No.: US 8,666,110 B2
(45) Date of Patent: Mar. 4, 2014

(54) METHOD AND APPARATUS FOR MASKING PRIVACY AREA OF IMAGE

(75) Inventors: Jang Hee Yoo, Daejeon (KR); Geon Woo Kim, Daejeon (KR); Jong Wook Han, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 202 days.

(21) Appl. No.: 12/907,562

(22) Filed: Oct. 19, 2010

(65) Prior Publication Data

US 2011/0150327 A1 Jun. 23, 2011

(30) Foreign Application Priority Data

Dec. 18, 2009 (KR) ........................ 10-2009-0127496
Jun. 3, 2010 (KR) ........................ 10-2010-0052216

(51) Int. Cl.
*G06K 9/00* (2006.01)
(52) U.S. Cl.
USPC ........................................................ 382/100
(58) Field of Classification Search
None
See application file for complete search history.

(56) References Cited

U.S. PATENT DOCUMENTS

| 2004/0081338 A1 | 4/2004 | Takenaka |
| 2005/0129272 A1 | 6/2005 | Rottman |
| 2005/0180595 A1 | 8/2005 | Horii et al. |
| 2007/0086626 A1* | 4/2007 | Mariani et al. ................ 382/115 |
| 2009/0016645 A1 | 1/2009 | Sako et al. |
| 2009/0220076 A1 | 9/2009 | Kuraki et al. |

FOREIGN PATENT DOCUMENTS

| JP | 2004-62560 A | 2/2004 |
| JP | 2005-236464 A | 9/2005 |
| JP | 2005-286468 A | 10/2005 |
| JP | 2006-217161 A | 8/2006 |
| JP | 2006-319775 A | 11/2006 |
| JP | 2008-236141 A | 10/2008 |
| JP | 2009-206990 A | 9/2009 |
| KR | 10-2001-0054914 | 7/2001 |

* cited by examiner

*Primary Examiner* — Stephen R Koziol
*Assistant Examiner* — Raphael Schwartz
(74) *Attorney, Agent, or Firm* — Kile Park Reed & Houteman PLLC

(57) ABSTRACT

Disclosed are a method and apparatus for masking a privacy area of an image. The method for masking a privacy area of an image includes: detecting a privacy area required to be protected in an image; and performing masking on the image. An important area (a face area of a person, a number plate area of a vehicle, a window area of a house, etc.) detected from an image inputted through a CCTV camera can be effectively and easily encrypted, scrambled, decoded, and descrambled. Also, the position of the important area detected before or after the important area is scrambled can be maintained to be consistent without having to use a metadata file. In addition, a scrambling algorithm of the same key value can be applicable regardless of the size of the important area. As a result, the system efficiency can be enhanced by effectively protecting personal information compared with a CCTV-based video security system.

11 Claims, 6 Drawing Sheets

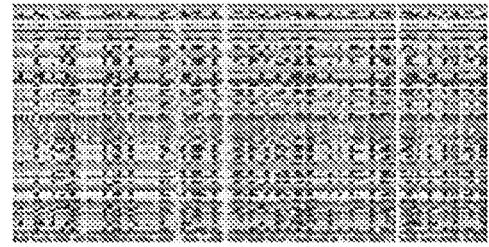
FIG. 5(a)  FIG. 5(b)
FIG. 5(c)  FIG. 5(d)
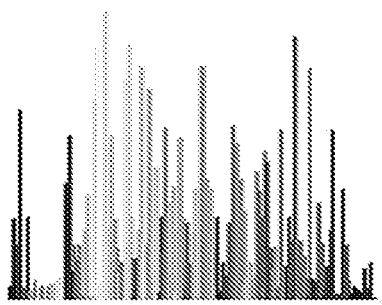
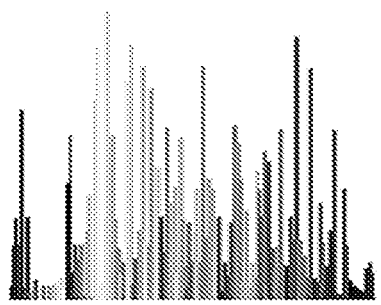
FIG. 5(e)  FIG. 5(f)

METHOD AND APPARATUS FOR MASKING PRIVACY AREA OF IMAGE

CROSS-REFERENCE TO RELATED APPLICATIONS

This application claims the priority of Korean Patent Application Nos. 10-2009-0127496 filed on Dec. 18, 2009 and 10-2010-0052216 filed on Jun. 3, 2010, and in the Korean Intellectual Property Office, the disclosures of which are incorporated herein by reference.

BACKGROUND OF THE INVENTION

1. Field of the Invention

The present invention relates to a method and apparatus for masking a privacy area of an image and, more particularly, to a method and apparatus for masking a privacy area of an image while maintaining the characteristics of the image.

2. Description of the Related Art

Presently, various methods for protecting privacy by masking features, such as a face and the like, that would otherwise reveal major personal information in images, have been developed. Among them, a method for manually designating a particular area and masking the designated area, a method for masking or encrypting an area of an object by using an existing object detection method, and the like, are largely used.

However, while these existing methods are available for uni-directional encryption, the decryption of an encrypted area is either not available or additional metadata must be maintained in order to decrypt the encrypted area.

Thus, the development of a technique for easily and effectively re-detecting an important area of an image such as a detected face, number plate, window, or the like, after the area has been encrypted and scrambled, and decoding the re-detected area, is required.

SUMMARY OF THE INVENTION

An aspect of the present invention provides a method for masking a privacy area of an image while maintaining the characteristics of the image.

Another aspect of the present invention provides an apparatus for masking a privacy area of an image while maintaining the characteristics of the image.

According to an aspect of the present invention, there is provided a method for masking a privacy area of an image, including: detecting a privacy area required to be protected in an image; and performing masking on the image.

In detecting the privacy area, the privacy area may be detected by using at least one of edge information, shape information, color distribution information, and learning information from the image, and acquired information regarding the privacy area.

In masking the image, scrambling may be performed on the privacy area of the image by using a scrambling key.

The method may further include: detecting the masked privacy area in the masked image; and performing unmasking on the masked image.

In detecting the masked privacy area, the masked privacy area may be detected by using at least one of edge information, shape information, color distribution information, and learning information from the masked image, and acquired information regarding the masked privacy area.

The color distribution information regarding the masked privacy area of the masked image may be identical to color distribution information regarding the privacy area.

In detecting the masked privacy area, the masked privacy area may be detected by using a mark for the masked privacy area.

In detecting the masked privacy area, the masked privacy area may be detected by using a sub-image including the masked privacy area.

In detecting the masked privacy area, the masked privacy area may be detected by using coordinate data of the masked privacy area.

In detecting the masked privacy area by using the coordinate data of the masked privacy area, the masked privacy area may be detected by adding the coordinate data in the form of a watermark into the image and preserving the same.

In performing unmasking on the masked image, descrambling may be performed on the masked privacy area by reversing the scrambling key.

According to another aspect of the present invention, there is provided an apparatus for masking a privacy area of an image, including: a masking unit performing masking on an image; storage unit storing the image and the masked image; an unmasking unit performing unmasking on the masked image; and a controller controlling the masking unit and the unmasking unit.

BRIEF DESCRIPTION OF THE DRAWINGS

The above and other aspects, features and other advantages of the present invention will be more clearly understood from the following detailed description taken in conjunction with the accompanying drawings, in which:

FIGS. 5(a) to 5(f) are views for explaining the sameness of color distribution information of a privacy area of a number plate and a masked privacy area through the method for masking a privacy area of an image according to an exemplary embodiment of the present invention.

DETAILED DESCRIPTION OF THE PREFERRED EMBODIMENT

Figure 1:
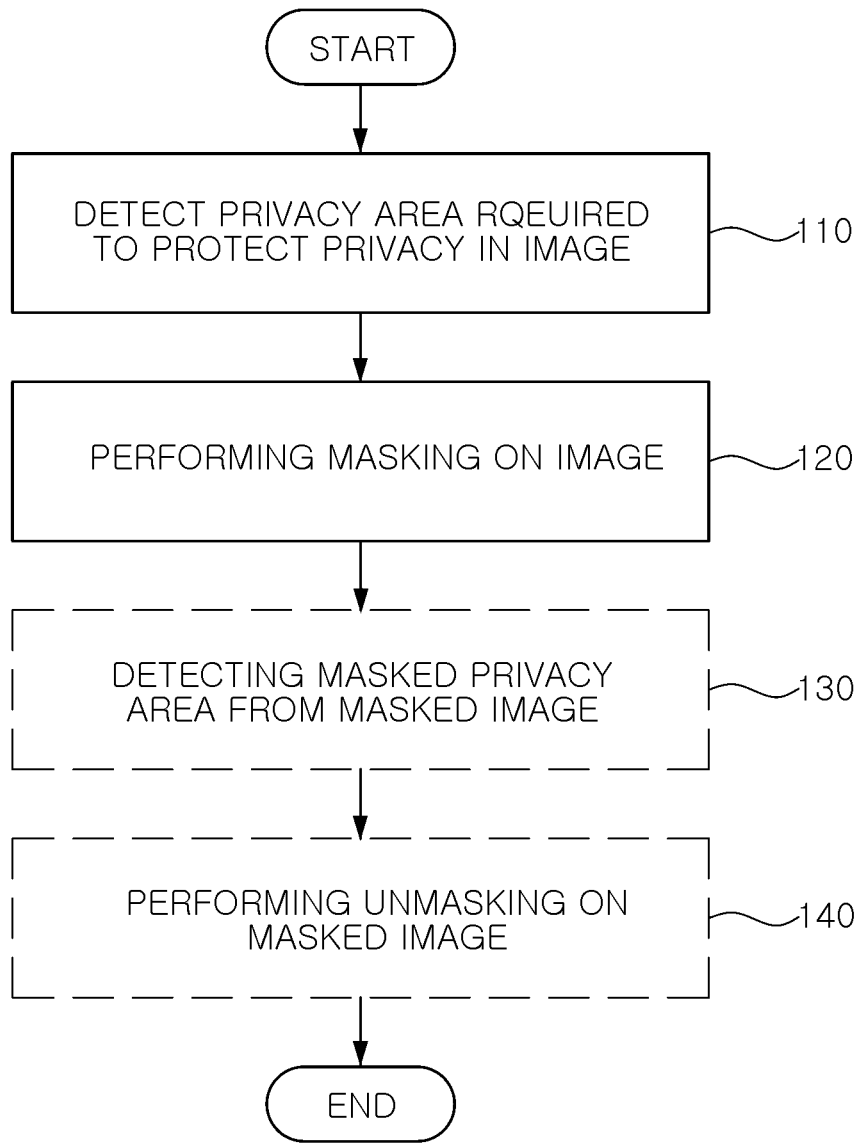
FIG. 1 is a flow chart illustrating a method for masking a privacy area of an image according to an exemplary embodiment of the present invention.

The present invention may be variably modified and may have various embodiments, particular examples of which will be illustrated in drawings and described in detail.

However, it should be understood that the following exemplifying description of the invention is not intended to restrict the invention to specific forms of the present invention but rather the present invention is meant to cover all modifications, similarities and alternatives which are included in the spirit and scope of the present invention.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component. The term "and/or" encompasses both combinations of the plurality of related items disclosed and any item from among the plurality of related items disclosed.

When a component is mentioned as being "connected" to or "accessing" another component, this may mean that it is directly connected to or accessing the other component, but it is to be understood that another component may exist therebetween. On the other hand, when a component is mentioned as being "directly connected" to or as "directly accessing" another component, it is to be understood that there are no other components in-between.

The terms used in the present application are merely used to describe particular embodiments, and are not intended to limit the present invention. An expression used in the singular encompasses the expression of the plural, unless it has a clearly different meaning in context. In the present application, it is to be understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Unless otherwise defined, all terms used herein, including technical and scientific terms, have the same meanings as those generally understood by those having ordinary knowledge in the field of the art to which the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present invention will be described below in detail with reference to the accompanying drawings, where those components are rendered using the same reference number that are the same or are in correspondence, regardless of the figure number, and redundant explanations are omitted.

FIG. 1 is a flow chart illustrating a method for masking a privacy area of an image according to an exemplary embodiment of the present invention.

With reference to FIG. 1, a method for masking a privacy area of an image according to an exemplary embodiment of the present invention may include detecting a privacy area required to be protected in an image (step 110), and performing masking on the image (step 120).

The method for masking a privacy area of an image according to an exemplary embodiment of the present invention may further include detecting the masked privacy area in the masked image (step 130), and performing unmasking on the masked image (step 140).

First, in detecting the privacy area (step 110), an area required to be protected for privacy may be detected.

Namely, when a face, by which a person can be identified, a number plate, by which a vehicle can be identified, or the like, is included in an image, the area of the face or the number plate may be detected to be privacy-masked.

Here, in detecting the privacy area (step 110), the privacy area may be detected by using at least one of edge information, shape information, color distribution information, and learning information from the image, and acquired information regarding the privacy area.

Namely, edge information may be acquired by analyzing the image, and the boundary between the face and portions other than the face can be detected by using the edge information. The analysis result of the image may be compared with and shape information regarding the shape of the face in order to determine whether or not the image information includes a face. In addition, the analysis result of the image may be compared with the color distribution information specific to the face, to thereby more accurately detect the face area. In addition, the face area can be detected by using acquired information regarding the privacy area including an Adaboost learning scheme, or the like.

Next, in performing masking on the image (step 120), scrambling may be performed on the privacy area of the image by using a scrambling key.

For example, scrambling may be performed by applying y=Kx (Here, X is an image before scrambling is performed thereon, K is a scrambling key, and y is an image after scrambling is performed thereon).

Figure 2A:
FIGS. 2(a) and 2(b) are views for explaining detection and masking a privacy area in an image through the method for masking a privacy area of an image according to an exemplary embodiment of the present invention.
Figure 2B:
Figure 3A:
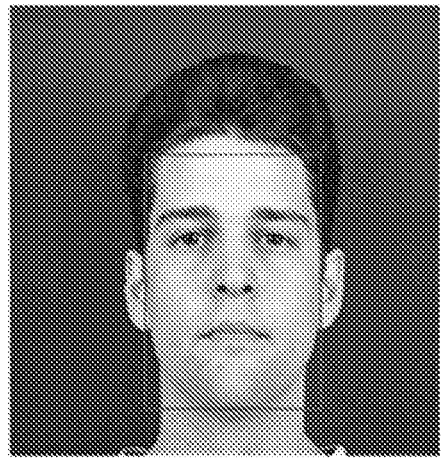
FIGS. 3(a) to 3(d) are views for explaining the detection and masking of a privacy area in an image and the detection and unmasking of the masked area through the method for masking a privacy area of an image according to an exemplary embodiment of the present invention.
Figure 3B:
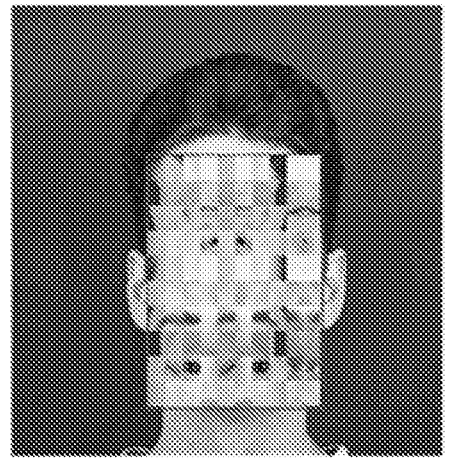
Figure 3C:
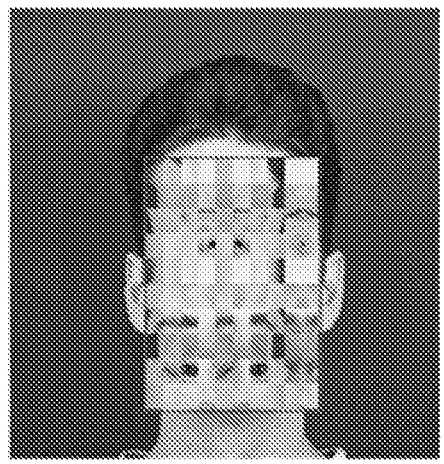
Figure 3D:
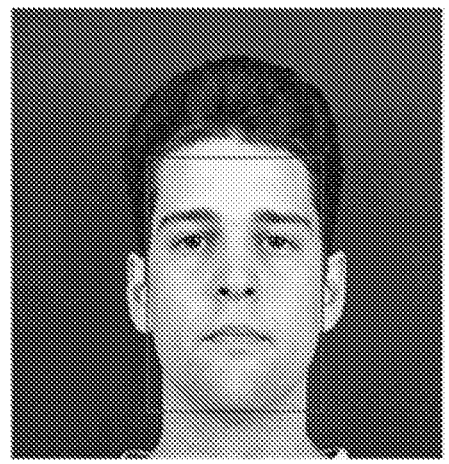
Figure 4A:
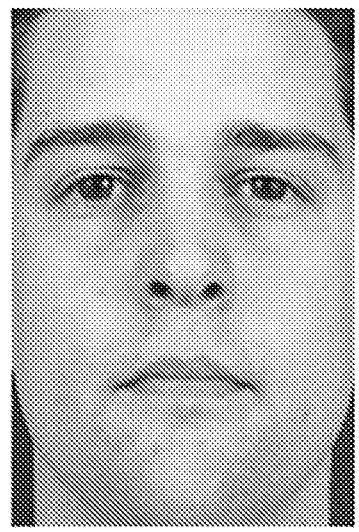
FIGS. 4(a) to 4(f) are views for explaining the sameness of color distribution information of a privacy area of a face and a masked privacy area through the method for masking a privacy area of an image according to an exemplary embodiment of the present invention.
Figure 4B:
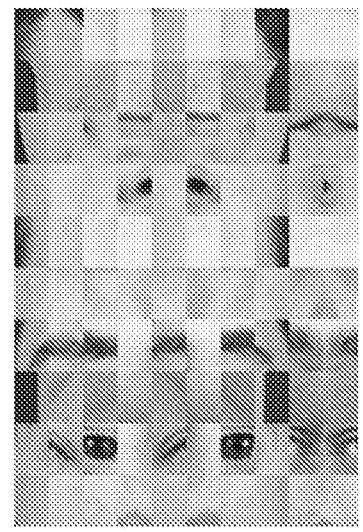
Figure 4C:
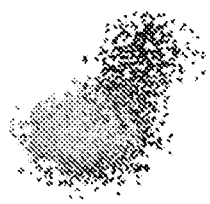
Figure 4D:
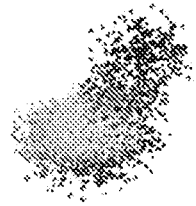
Figure 4E:
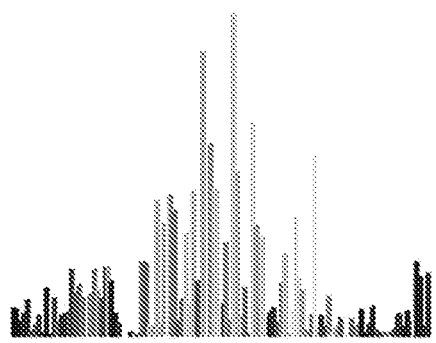
Figure 4F:
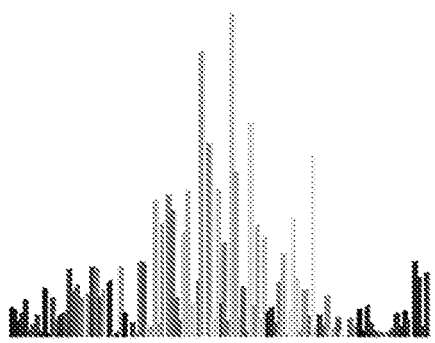

FIGS. 2(a) and 2(b) are views for explaining detection and masking a privacy area in an image through the method for masking a privacy area of an image according to an exemplary embodiment of the present invention.

With reference to FIGS. 1, 2(a), and 2(b), FIG. 2(a) shows a case in which a face area, an area for identifying a person, is detected from a general image such as a CCTV image.

In FIG. 2(a), a portion indicated in a quadrangular shape is detected as a facial area from the image, and in this case, the portion indicated in the quadrangular shape is detected by using at least one of the edge information, shape information, color distribution information, and learning information from the image, and acquired information regarding the privacy area.

FIG. 2(b) shows a case in which the portion indicated in the quadrangular shape in FIG. 2(a) is masked. Namely, the privacy area, the face area of the person, is masked by using a scrambling method. Thus, even in the case that the image is in use, the image can be masked such that a person captured in the image cannot be identified.

Subsequently, in detecting the masked privacy area in the masked image (step 130), the masked privacy area can be detected by using at least one of the edge information, shape information, color distribution information, and learning information from the masked image, and acquired information regarding the masked privacy area.

As discussed above, because the masked privacy area of the masked image has distinctive characteristics compared with areas other than the masked privacy area, the discriminated area can be detected by using the edge information or learning information of the masked image, and the face of the person, a number plate of a vehicle, or the like, can be detected by using the shape information and the color distribution information. In addition, the face area can be detected by using acquired information regarding the masked privacy area including the Adaboost learning scheme, or the like.

Also, in detecting the masked privacy area from the masked area (step 130), the masked privacy area may be detected by using the following method other than the method of using one of the edge information, shape information, color distribution information, and learning information from the masked image, and acquired information regarding the masked privacy area.

Namely, in detecting the masked privacy area, the masked privacy area may be detected by using an indication of the masked privacy area. Namely, the masked privacy area may be detected by using a method of indicating the masked privacy area in the form of a diagram using a particular color, or the like.

In detecting the masked privacy area, the masked privacy area may be detected by using a sub-image including the masked privacy area.

Namely, in order to store the masked privacy area, the privacy area may be detected by using a method of storing a particular image format (e.g., an indexed image format) in a sub-image and delivering the same.

In detecting the masked privacy area, the masked privacy area may be detected by using coordinate data of the masked privacy area. In particular, in detecting the masked privacy area by using coordinate data of the masked privacy area, the coordinate data may be added in the form of a watermark into an image, which is preserved and then detected.

Namely, some coordinates indicating the masked privacy area may be searched, and the searched coordinate data may be additionally inserted in the form of a watermark, or the like, into the image, to detect the masked privacy area.

In performing unmasking on the masked image (step 140), descrambling may be performed on the masked privacy area by using the scrambling key reversely.

FIGS. 3(*a*) to 3(*d*) are views for explaining the detection and masking a privacy area in an image and detection and unmasking of the masked area through the method for masking a privacy area of an image according to an exemplary embodiment of the present invention.

With reference to FIGS. 1 and 3(*a*) to 3(*d*), FIG. 3(*a*) shows a case in which a face area, an area for identifying a person, is detected from an image, and FIG. 3(*b*) shows a case in which the portion indicated in the quadrangular shape in FIG. 2(*a*) is masked.

In addition, FIG. 3(*c*) shows a case in which the masked privacy area is detected from the masked area. In FIG. 3(*c*), it is noted that the portion indicated in a quadrangular shape is detected as the face area.

In this case, because the masked privacy area of the masked image has distinctive characteristics compared with areas other than the masked privacy area, the discriminated area can be detected by using the edge information of the masked image, and the face of the person can be determined by using the shape information, the color distribution information, or the acquired information regarding the masked privacy area.

In particular, in order to detect the masked privacy area from the masked area, the characteristics that the sameness between the color distribution information regarding the masked privacy area of the masked image and that of the original privacy area before the image is masked is maintained can be used. The sameness of the both units of color distribution information will be described with reference to FIGS. 4 and 5.

FIG. 3(*d*) shows the results obtained by performing masking on the masked privacy area of the masked area. The unmasked image can be obtained by reversely performing the scrambling calculation by applying the same scrambling key as that when the scrambling was performed on the masked privacy area.

FIGS. 4(*a*) to 4(*f*) are views for explaining the sameness of color distribution information regarding a privacy area of a face and a masked privacy area through the method for masking a privacy area of an image according to an exemplary embodiment of the present invention.

Specifically, FIG. 4(*a*) shows a face area detected as a privacy area, and FIG. 4(*b*) shows the results obtained by masking the face area detected as the privacy area.

FIGS. 4(*c*) and 4(*d*) show color densities over the results obtained by masking the original face area detected as the privacy area as shown in FIG. 4(*a*) and the face area detected as the privacy area as shown in FIG. 4(*b*).

FIGS. 4(*e*) and 4(*f*) show color distributions over the results obtained by masking the original face area detected as the privacy area as shown in FIG. 4(*a*) and the face area detected as the privacy area as shown in FIG. 4(*b*).

Based on the obtained results, it is noted that the color distribution information including the color density and the color distribution of the masked privacy area of the masked area is identical to that of the privacy area.

Namely, the color distribution information regarding the original face area, the privacy area, has the same characteristics as those of the color distribution information regarding the masked face area of the masked image.

FIGS. 5(*a*) to 5(*f*) are views for explaining the sameness of color distribution information regarding a privacy area of a number plate and a masked privacy area through the method for masking a privacy area of an image according to an exemplary embodiment of the present invention.

Specifically, FIG. 5(*a*) shows a number plate area of a vehicle detected as a privacy area, and FIG. 5(*b*) shows the results obtained by masking the number plate area of the vehicle detected as the privacy area.

FIGS. 5(*c*) and 5(*d*) show color densities over the results obtained by masking the original number plate area of a vehicle detected as the privacy area as shown in FIG. 5(*a*) and the number plate area of a vehicle detected as the privacy area as shown in FIG. 5(*b*).

FIGS. 5(*e*) and 5(*f*) show color distributions over the results obtained by masking the original number plate area of a vehicle detected as the privacy area as shown in FIG. 5(*a*) and the number plate area of a vehicle detected as the privacy area as shown in FIG. 4(*b*).

Just as in the results of the above-mentioned case, it is noted that the color distribution information including the color density and the color distribution of the masked privacy area of the masked area is identical to that of the privacy area.

Namely, the color distribution information of the original number plate area of a vehicle, the privacy area, has the same characteristics as those of the color distribution information regarding the scrambled number plate area of a vehicle of a masked image.

From such results, it is noted that the use of the color distribution information and the edge information can be effective in obtaining the same area detection results with respect to the privacy area.

Figure 6:
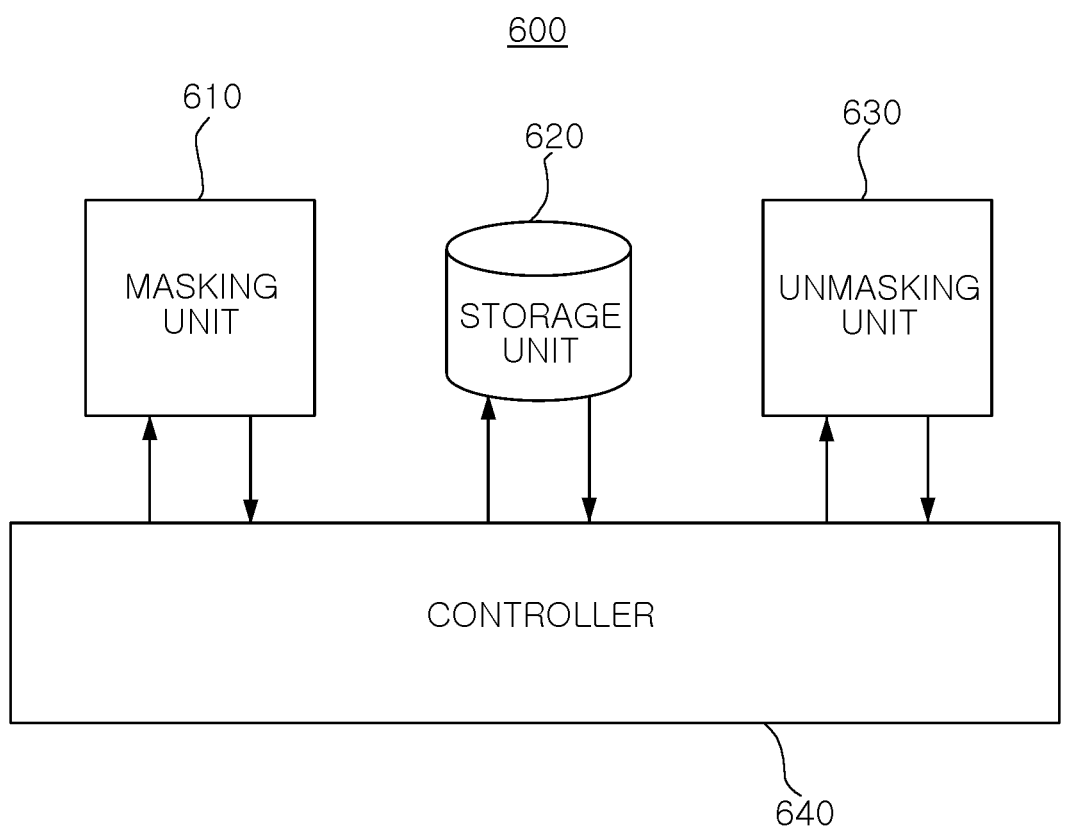
FIG. 6 is a schematic block diagram of an apparatus for masking a privacy area of an image according to an exemplary embodiment of the present invention.

FIG. 6 is a schematic block diagram of an apparatus for masking a privacy area of an image according to an exemplary embodiment of the present invention.

With reference to FIG. 6, the apparatus for masking a privacy area of an image includes a masking unit 610 performing masking on an image, a storage unit 620 storing the image and the masked image, an unmasking unit 630 performing unmasking on the masked image, and a controller 640 controlling the masking unit and the unmasking unit.

First, the masking unit 610 may perform masking on an image. In detail, the masking unit 610 may detect a privacy area to be protected by using at least one of edge information, shape information, color distribution information, and learning information from the image, and acquired information regarding the privacy area, and perform masking on the detected privacy area.

Also, in performing masking on the image, the masking unit 610 may perform scrambling on the privacy area by using a scrambling key.

The storage unit 620 may serve as a space for storing the image and the masked image.

The unmasking unit 630 may perform unmasking on the masked image. In performing unmasking, the unmasking unit 630 may detect the masked privacy area in the masked image and then perform unmasking on the masked image.

In detecting the masked privacy area, the unmasking unit 630 may detect the masked privacy area by using at least one of edge information, shape information, color distribution information, and learning information from the masked image, and acquired information regarding the privacy area.

Here, the color distribution information of the masked privacy area of the masked area may be identical to that of the privacy area. Namely, the color distribution information of the original image of the privacy area may have the same characteristics as that of the scrambled privacy area after scrambling is performed.

In addition, in performing unmasking on the masked image, the unmasking unit 630 may perform descrambling by reversely applying the scrambling key to the masked privacy area.

The controller 640 may control the masking unit 610, the storage unit 620, and the unmasking unit 630.

As set forth above, in the method and apparatus for masking a privacy area of an image according to exemplary embodiments of the invention, an important area (a face area of a person, a number plate area of a vehicle, a window area of a house, etc.) detected from an image inputted through a CCTV camera can be effectively and easily encrypted, scrambled, decoded, and descrambled. Also, the position of the important area detected before or after the important area is scrambled can be maintained to be consistent without having to use a meta data file. In addition, a scrambling algorithm of the same key value can be applicable regardless of the size of the important area. As a result, the system efficiency can be enhanced by effectively protecting personal information compared with a CCTV-based video security system.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for masking a privacy area of an image, the method comprising:
    detecting a privacy area required to be protected in an image by using color distribution information of the privacy area;
    performing, by a masking hardware unit, masking on the privacy area of the image;
    detecting a masked privacy area in the masked image by using color distribution information of the masked privacy area; and
    performing unmasking on the masked privacy area of the masked image.

2. The method of claim 1, wherein, in detecting the privacy area, the privacy area is detected by using at least one of edge information, shape information, color distribution information, and learning information from the image, and acquired information regarding the privacy area.

3. The method of claim 1, wherein, in masking the image, scrambling is performed on the privacy area of the image by using a scrambling key.

4. The method of claim 1, wherein, in detecting the masked privacy area, the masked privacy area is detected by also using at least one of edge information, shape information, and learning information from the masked image.

5. The method of claim 1, wherein the color distribution information of the masked privacy area is identical to the color distribution information of the privacy area.

6. The method of claim 1, wherein, in detecting the masked privacy area, the masked privacy area is detected by also using a mark for the masked privacy area.

7. The method of claim 1, wherein, in detecting the masked privacy area, the masked privacy area is detected by also using a sub-image including the masked privacy area.

8. The method of claim 1, wherein, in detecting the masked privacy area, the masked privacy area is detected by also using coordinate data of the masked privacy area.

9. The method of claim 8, wherein, in detecting the masked privacy area by using the coordinate data of the masked privacy area, the masked privacy area is detected by adding the coordinate data in the form of a watermark into the image and preserving the same.

10. The method of claim 1, wherein, in performing unmasking on the masked privacy area, descrambling is performed on the masked privacy area by using a scrambling key reversely.

11. An apparatus for masking a privacy area of an image, the apparatus comprising:
    a masking hardware unit configured to:
        detect a privacy area to be protected in an image by using color distribution information of the privacy area;
        perform masking on the privacy area of the image;
    a storage hardware unit configured to store the image and the masked image;
    an unmasking hardware unit configured to:
        detect a masked privacy area in the masked image by using color distribution information of the masked privacy area; and
        perform unmasking on the masked privacy area of the masked image; and
    a hardware controller configured to control the masking unit and the unmasking unit.

* * * * *